United States Patent
Chari et al.

(10) Patent No.: US 9,769,208 B2
(45) Date of Patent: Sep. 19, 2017

(54) INFERRING SECURITY POLICIES FROM SEMANTIC ATTRIBUTES

(71) Applicant: International Business Machines Corporation, Armonk, NY (US)

(72) Inventors: Suresh N. Chari, Tarrytown, NY (US); Christopher Gates, Culver City, CA (US); Ian M. Molloy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/724,012

(22) Filed: May 28, 2015

(65) Prior Publication Data

US 2016/0352778 A1 Dec. 1, 2016

(51) Int. Cl.
*G06F 17/00* (2006.01)
*H04L 29/06* (2006.01)
*G06N 99/00* (2010.01)

(52) U.S. Cl.
CPC .......... *H04L 63/20* (2013.01); *G06N 99/005* (2013.01); *H04L 63/102* (2013.01)

(58) Field of Classification Search
CPC ... H04L 63/20; H04L 63/102; H04L 63/0227; G06F 21/6218; G06F 21/604
USPC ..................................................... 726/1–21
See application file for complete search history.

(56) References Cited

U.S. PATENT DOCUMENTS

| | | | |
|---|---|---|---|
| 6,981,040 B1 | 12/2005 | Konig et al. | |
| 8,095,959 B2 | 1/2012 | Kuno et al. | |
| 8,532,978 B1 * | 9/2013 | Turner | G06F 17/271 704/10 |
| 2011/0072052 A1 * | 3/2011 | Skarin | G06Q 10/10 707/794 |
| 2012/0124643 A1 * | 5/2012 | Moriconi | H04L 63/20 726/1 |
| 2012/0254143 A1 * | 10/2012 | Varma | G06F 17/30401 707/706 |

OTHER PUBLICATIONS

A.P. Felt et al., "The Effectiveness of Application Permissions," Proceedings of the 2nd USENIX conference on Web application development, WebApps' 11 pp. 1-12 (Jun. 2011).
(Continued)

*Primary Examiner* — Evans Desrosiers
(74) *Attorney, Agent, or Firm* — Jeff LaBaw; Michael J. Chang, LLC

(57) ABSTRACT

Techniques for inferring security policies from semantic attributes are provided. In one aspect, a method for building a query component executable by a processor is provided. The method includes the steps of: (a) providing subjects and permissions related to making a security policy decision, as well as a training set of permission-to-subject assignments, as inputs to the security policy query component; (b) extracting semantic attributes from natural language freeform text descriptions of the subjects and the permissions; and (c) using machine learning to build the security policy query component based on the permission-to-subject assignments in the training set and the semantic attributes extracted in step (b).

17 Claims, 4 Drawing Sheets

(56) References Cited

OTHER PUBLICATIONS

W. Enck et al., "On Lightweight Mobile Phone Application Certification," Proceedings of the 16th ACM conference on computer and communications security, CCS '09, pp. 235-245, New York, NY (Nov. 2009).
H. Peng et al., "Using Probabilistic Generative Models for Ranking Risks of Android Apps," Proceedings of the 2012 ACM conference on computer and communications security, CCS'12, pp. 241-252, New York, NY (Oct. 2012).
B. Sarma et al., "Android Permissions: A Perspective Combining Risks and Benefits," SACMAT '12: Proceedings of the seventeenth ACM symposium on access control models and technologies pp. 13-22 (Jun. 2012).
R. Pandita et al., "WHYPER: Towards Automating Risk Assessment of Mobile Applications," Proceedings of the 22nd USENIX Conference on Security, SEC '13, pp. 527-542, Berkeley, CA (Aug. 2013).
M. Frank et al., "A Probabilistic Approach to Hybrid Role Mining," Proceedings of the 16th ACM conference on computer and communications security (Nov. 2009) 11 total pages.
I. Molloy et al., "Mining Roles with Noisy Data," Proceedings of the 15th ACM symposium on access control models and technologies (Jun. 2010) 11 total pages.
Z. Xu et al., "Mining Attribute-based Access Control Policies ," Proceedings of the 10th international conference & expo on emerging technologies for a smarter world (CEWIT 2013), IEEE Press pp. 1-22 (Oct. 2013).
Z. Xu et al., "Mining Attribute-Based Access Control Policies from Logs," Proceedings of the 28th annual IFIP WG 11.3 working conference on data and applications security and privacy (DBSec 2014) (Jul. 2014) 16 total pages.
S.J. Stolfo et al., "Anomaly Detection in Computer Security and Application to File System Accesses," ISMIS 2005 pp. 14-28 (Feb. 2005).
R.S. Sandhu et al., "Role-Based Access Control Models," IEEE Computer, 29(2):38-47, Feb. 1996.
D.M. Blei et al., "Latent Dirichlet Allocation," Journal of Machine Learning Research, pp. 993-1022 (Jan. 2003).
I. Molloy et al., "Generative Models for Access Control Policies: Applications to Role Mining Over Logs with Attribution," Proceedings of the 17th ACM symposium on access control models and technologies, pp. 1-11 (Apr. 2012).
M.F. Porter, "An algorithm for suffix stripping," Program, 14, No. 3, pp. 130-137 (Jul. 1980).

* cited by examiner

INFERRING SECURITY POLICIES FROM SEMANTIC ATTRIBUTES

FIELD OF THE INVENTION

The present invention relates to security policies, and more particularly, techniques for inferring security policies from semantic attributes.

BACKGROUND OF THE INVENTION

Users are frequently asked to make security-critical decisions, often without adequate understanding of what is being asked of them, or the consequences of their actions. In the Android™ platform, for example, prior to installation, users are expected to review the permissions requested by an application and accept the inherent risks in allowing those permissions. Not surprisingly, users simply click through this initial consent step, often resulting in poorly understood authorizations. See, for example, A. P. Felt et al., "The Effectiveness of Application Permissions," Proceedings of the $2^{nd}$ USENIX conference on Web application development, WebApps' 11 (June 2011). The user may have a high level understanding of the features they expect the application to provide, but not grasp the minimal security controls necessary to enable these functions.

In many organizations, managers are frequently asked to approve and [re]-certify access for employees. In these instances, end users who are expected to make the critical decisions lack the understanding or insight that is necessary to make a fully informed decision. Android end users cannot be expected to understand why an application is requesting certain and often very specific permissions, or why those requests may be considered normal or risky.

Furthermore, knowledge of the requirements of an access control policy is often split between different entities: managers understand their end users but lack an understanding of the technical systems, which is handled by information technology (IT) administrators. These gaps result in risks to end users and enterprise resources.

Therefore, techniques that enable users to make intelligent choices for security critical decisions (e.g., that inform users of the risks of granting a permission to an application) would be desirable.

SUMMARY OF THE INVENTION

The present invention provides techniques for inferring security policies from semantic attributes. In one aspect of the invention, a method for building a security policy query component executable by a processor is provided. The method includes the steps of: (a) providing subjects and permissions related to making a security policy decision, as well as a training set of permission-to-subject assignments, as inputs to the security policy query component; (b) extracting semantic attributes from natural language freeform text descriptions of the subjects and the permissions (the freeform text may also be extracted from key-value pairs of attributes describing the subjects and the permissions); and (c) using machine learning to build the security policy query component based on the permission-to-subject assignments in the training set and the semantic attributes extracted in step (b).

A more complete understanding of the present invention, as well as further features and advantages of the present invention, will be obtained by reference to the following detailed description and drawings.

DETAILED DESCRIPTION OF PREFERRED EMBODIMENTS

Figure 1:
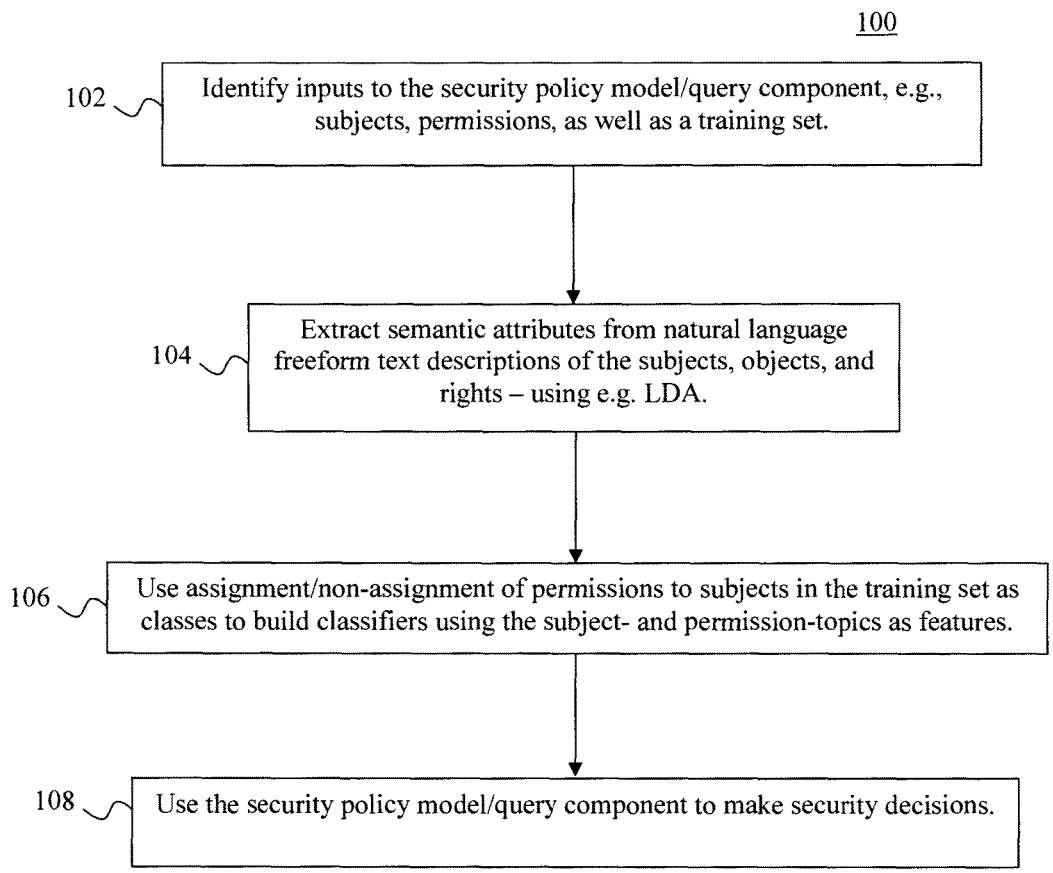
FIG. 1 is a diagram illustrating an exemplary methodology for building a security policy query component from semantic attributes according to an embodiment of the present invention.

Provided herein are techniques that permit users to make intelligent choices for security critical decisions by informing users of the risks of granting a permission to an application. As will be described in detail below, the present techniques involve inferring a security policy from semantic attributes of subjects, objects, and rights arising in diverse domains, e.g., permissions requested by mobile applications, access control policies in a large enterprise, filesystem access in a source code control system, Web applications, cloud applications, database systems, etc. The semantic attributes are obtained from natural language freeform text descriptions of subjects and permissions. The freeform text may also be extracted from attribute key-value pairs describing the subjects and the permissions. The inferred security policy can then be used to identify the risk of further policy grant/deny decisions (such as granting or denying permissions to the subjects which allows them to perform specific operations on objects). This will enable users to make intelligent choices for security critical decisions: in the Android platform for example, users can be informed of the risks of granting a permission to an application, administrators can grant employees access based on a concrete understanding of risks, etc.

A general approach is defined herein which builds topic models independently for subjects and permissions based on raw attribute inputs such as natural language freeform text descriptions of subjects, objects and rights. Standard machine learning techniques are then used to build a policy from these inferred semantic topics to assignments from a training set. This can then be used to build risk models for future assignments and provide decision support for security decisions. For Android, e.g., the risk of granting a particular permission to a given application can be assessed based on its textual description. Another application of the present techniques is to estimate the risk of policy assignment in an enterprise access control policy based on user attributes and textual business language descriptions of applications.

Specifically, according to the present techniques, the intended security policy is first inferred based on attributes derived from natural language description of subjects, objects, and rights, and a function is learned which maps these attributes to assignments. Instead of merely looking at a set of access control lists (ACLS), preexisting information (such as attributes and natural language descriptions of objects) is leveraged herein to help model the expected behavior on a system. Subsequently, the risk or likelihood of permission or policy assignments can then be evaluated using more, but also potentially noisier, information and attributes. Learning from examples can be used to alert end users when there is a discrepancy between the attributes of users and objects, and what is being requested. For Android, for example, the present techniques can be used to highlight when an application is requesting a permission that it is not disclosing (and conversely, highlight which features or parts of the description necessitate a permission), which can raise awareness of the end user and provide more comprehensive risk information.

An overview of the present techniques is now provided by way of reference to FIG. 1 which is a diagram illustrating an exemplary methodology 100 for inferring a security policy from semantic attributes in accordance with the present techniques. Methodology 100 is performed to ultimately produce a security policy model against which authorization request queries can be made to classify risk, assess likelihood of assignments, etc. Since authorization request queries can be made against the security policy model, the security policy model may also be referred to herein generally as a security policy query component which, as provided below, can be executable by a processor. First in step 102, inputs to the model/security policy query component are provided. According to an exemplary embodiment, the inputs include subjects and permissions (i.e., rights to objects) related to making security policy decisions which arise in different domains, as well as a training set containing example assignments which allow subjects to access the permission objects (i.e., sample permission-to-subject assignments). By way of example only, subjects may include users or Android applications; permission objects may include Android permissions, filesystem resources, or enterprise application resources; and permission rights may include read, write, or execute. For both the subjects and permissions, it is assumed that there are attributes which can be leveraged.

In step 104, semantic feature extraction (SFE) is used to extract semantic attributes (e.g., latent topics) from natural language freeform text descriptions of the subjects and the permissions. According to an exemplary embodiment, this feature extraction is performed using latent Dirichlet allocation (LDA). See, for example, FIG. 3 wherein LDA is used to build topic models independently for the attributes that are related to the subjects and permissions directly from the key-value pairs and the freeform text descriptions of the subjects and the permissions.

In step 106, using the assignment and non-assignment of permissions to subjects in the training set as two distinct classes, classifiers are built using the subject-topics and permission-topics as features. This process produces a security policy query component—i.e., the security policy model—for how the latent attributes imply assignment of permissions.

In step 108, the security policy query component may then be employed in making security policy decisions. For example, the security policy query component may be used to assess the risk for existing authorizations to ensure compliance, provide evidence for decision support systems, enable end users to make intelligent choices for security decisions while providing consumable evidence, and provide recommendations for assignments of both new subjects and permissions. New applications, resources, and datasets in an existing organization can be easily handled. The risks presented here are heuristics, and not metrics. A goal of the present techniques is to generate information that can be leveraged at important decision making moments, rather than to identify malicious behavior. For instance, when a new permission is added to the system, we find its topics from the description of the permission (see above) and for each subject ask the built security policy query component if the subject should be assigned the permission or not. When a new subject is added, the same query of the built security policy query component can be made, except that the task here is to determine, for each permission, whether to assign it to the new subject or not. When we want to consider any subject-permission assignment, we simply query the learned security policy query component.

By way of example only, the approach set forth in methodology 100 has been applied with minimal domain-specific preprocessing to the following diverse set of problems:

Android App Risk Evaluation:

In this domain, the descriptions of applications (i.e., "apps") in Google Play™ or any other application store are mined to better understand how apps are requesting permissions. The semantic attributes for each app consist of the topics that the apps discuss in their descriptions, and these attributes are used to learn the relationship between the topics mentioned in the apps description and permissions requested by the app. Unexpected permission requests can contribute to a risk score for the app and be highlighted during the app selection process. In accordance with the present techniques, all training is done automatically and retraining can be performed periodically to handle new types of apps which might have very specific permission requirements. The present approach substantially generalizes all prior solutions to provide decision support for Android permissions and provide risk assessment for end users: it can work with existing text descriptions, leverage frequently co-occurring permissions, handle Google Play application categories, and accommodate both new applications and evolving permissions sets.

Anomalous Filesystem Access:

Another domain to which the present techniques have been applied is in identifying when a user's access to files or documents may be anomalous. Employee attributes are extracted to gain context for the possible behaviors of an employee, and then this context is applied to predict the data that an employee should or should not have access to and detect anomalies within the access patterns of the users. The intuition is that the job role, department, previous accesses, and several other attributes about an employee will help to narrow the expectation of what a user will access and how a user will interact with the overall system.

Policy Risk Assignment:

The present approach has also been applied to enterprise access control policies and the assignment of application permissions to employees. In this context, the present techniques are used to assess policy risk as it pertains to the mismatch between user attributes and permission attributes. Employee attributes are extracted to gain context for possible behavior, and correlate access with natural language descriptions of application permissions. This builds on the previous example where the high-level description of the permission provides an indication of the type of task the application performs, which implies the type of employee, or qualifications, that are necessary to use the application. The present approach provides a bridge between information technology (IT) security policies and tools that business application owners use, thereby closing the gap between intent and actual realization of security policies. Further, this can be seen as a realization of a generalized attribute based access control policy without requiring any explicit policy definition language. This is capable of handling employees changing position and becoming a mismatch with their authorizations.

In each of these domains, the present approach produces excellent results as measured using precision and recall against held out assignments, subjects, and permissions. In particular, Precision for Android permission modeling—When evaluated against 100K applications from Google Play, the present techniques produce precision of 0.75 in determining if applications should request permissions from just their descriptions.

Accurate Prediction of Files Accessed—Given a learned model for filesystem accesses, then for a new file, the semantic attributes can be extracted from the file path and predict a user's need to access the file with high precision (0.95).

High Accuracy Policy Modeling—Given a learned model for an enterprise access control policy, and given a new user or new permission, the present techniques can predict the authorizations for the user or permission with high precision (0.87 for new users and 0.82 for new permission).

While the present approach can be generally applied to a variety of different domains—such as in the examples provided above—it also performs favorably when compared to domain specific tailored solutions. By way of example only, in the Android domain, the present techniques are more effective than previous work which simply learns rules or a general model for permission requests without understanding potential functionality which might make specific permissions necessary. See, for example, W. Enck et al., "On Lightweight Mobile Phone Application Certification," Proceedings of the 16$^{th}$ ACM conference on computer and communications security, CCS '09, pgs. 235-245, New York, N.Y. (November 2009); H. Peng et al., "Using Probabilistic Generative Models for Ranking Risks of Android Apps," Proceedings of the 2012 ACM conference on computer and communications security, CCS '12, pgs. 241-252, New York, N.Y. (October 2012); and B. Sarma et al., "Android Permissions: A Perspective Combining Risks and Benefits," SACMAT '12: Proceedings of the seventeenth ACM symposium on access control models and technologies (June 2012). The present approach is more flexible than the ideas proposed by Whyper which necessitates a manual effort to develop and maintain a proper ontology and lexicon to be effective. See R. Pandita et al., "WHYPER: Towards Automating Risk Assessment of Mobile Applications," Proceedings of the 22$^{nd}$ USENIX Conference on Security, SEC '13, pgs. 527-542, Berkeley, Calif. (August 2013) (hereinafter "Pandita"). In the access control policy domain, the present techniques generalize prior work from the role and policy mining domains, extending beyond single subject attribute and use of attributes in policy de-noising. See, for example, M. Frank et al., "A Probabilistic Approach to Hybrid Role Mining," Proceedings of the 16$^{th}$ ACM conference on computer and communications security (November 2009) (hereinafter "Frank") and I. Molloy et al., "Mining Roles with Noisy Data," Proceedings of the 15$^{th}$ ACM symposium on access control models and technologies (June 2010), respectively. Since the present approach can handle domains that lack key-value attributes by leveraging more semantically rich textual descriptions, it also generalizes recent work on mining attribute-based access control policies. See, for example, Z. Xu et al., "Mining Attribute-based Access Control Policies," Proceedings of the 10$^{th}$ international conference & expo on emerging technologies for a smarter world (CEWIT 2013), IEEE Press (2013) and Z. Xu et al., "Mining Attribute-Based Access Control Policies from Logs," Proceedings of the 28$^{th}$ annual IFIP WG 11.3 working conference on data and applications security and privacy (DBSec 2014) (July 2014). It is also more robust to noise because it does not attempt to fit an existing policy to logic rules.

Finally, while there is a large body of work on anomaly detection for filesystem access based on statistical methods (e.g., rate and frequency), the best comparison is with the work of S. J. Stolfo et al., "Anomaly Detection in Computer Security and Application to File System Accesses," ISMIS 2005 (February 2005), which only considers the parent directly of new file access requests. The present approach considers all components and semantic information embedded in a resource path name and their components as well as additional user and resource attributes.

Problem Statement:

This section formalizes the core problem and describes how these differing domains are instances of a broader framework.

A semantic access control configuration $\rho=(S,P,\gamma,A)$ is defined where S is a set of subjects and P a set of permissions, where $P \subseteq R \times O$ for rights R and objects O. A security policy $\gamma \subseteq S \times P$ is a subject-to-permission assignment relation. The goal is to infer security policies from attributes defined by A which is a function that maps subjects and permissions to key-value attributes, A: $S \cup P \times E^+ \rightarrow \Sigma^*$ for some alphabet $\Sigma$, e.g., the alphanumeric characters. No assumptions are made on the type of values and they can be free-form text over some alphabet.

The objective of the present approach is to learn a policy model P: $A \times S \times P \rightarrow \gamma'$ that minimizes the error between the policy $\gamma$ and the learned policy $\gamma'$, e.g., $\|\gamma-\gamma'\|$, the number of subject-permission pairs where the semantic policy differs from the specified or deployed policy. Evaluation metrics are used that are directly derived from this objective given real-world practical problems, such as handling new subjects or new permissions, and properties of the data, such as sparsity.

For the Android permissions problems, the mapping is straightforward: S is the set of applications and P the set of permissions that applications can request on the device. The primary attribute considered herein is the textual description of the application submitted by the developer when submitting to Google's Play store and Google's terse permission descriptions. In this case, the present techniques will produce a list of permissions to assign to the app based on its textual description. No assumptions on the format of the description are made.

Next, a predictor is learned for filesystem accesses based on user attributes as well as semantic features extracted from filenames, path names, and types. This approach leverages several conventions commonly used in filesystem hierarchies, such as nesting projects and components into named directories or providing meaningful names using multiple-word concatenations in CamelCase.

The third use case is in the access control policy application, wherein a policy is learned which maps user attributes and application attributes including textual descriptions of the application function. This greatly simplifies policy definition: the application owner needs to map application permissions to abstract IT concepts such as roles, describing the functions the application supports.

Approach:

The present techniques utilize the same underlying philosophy behind role-based access control (RBAC): access can be organized around semantic constructs representing competency of tasks, responsibilities, and duties. See, for example, R. S. Sandhu et al., "Role-Based Access Control Models," IEEE Computer, 29(2):38-47, February 1996, the contents of which are incorporated by reference as if fully set forth herein. In particular, the present techniques take insights from the Enterprise RBAC model that groups users into business roles and permissions into technical/functional roles, and assigns business roles to technical roles with a one-level role hierarchy. While the present approach is not specific to, or tied in any way, to RBAC it is a useful analogy.

Permissions are often grouped together into technical roles that represent a core set of responsibilities, e.g., a task or workflow to be performed. The permissions assigned to a role dictate its function; if the role represents a task, the permissions are the individual components of the task. Descriptions of permissions assigned to a task each provide a small piece, and together fully describe the functions of a role. In this way, analogies may be drawn to document topic models, such as latent Dirichlet allocation (LDA). See, for example, D. M. Blei et al., "Latent Dirichlet Allocation," Journal of Machine Learning Research, pgs. 993-1022 (January 2003), the contents of which are incorporated by reference as if fully set forth herein. The functionality of a role is analogous to a document whose content is the sum of the descriptions of permissions assigned to it. For example, a role may contain mostly administrative tasks, some developer tasks, and an engineer task. By applying LDA to a corpus, one can automatically learn which topics (or subtasks) a permission pertains to. Similarly, attributes and descriptions of subjects, such as the resume of an employee, define unique skills, qualifications, and expertise of subjects. These are used to assign a user a position in an organization, which directly determines the authorizations they are required. Similar to extracting latent topics for permissions, LDA can be used to extract topics of users: managers, developers, security specialists, consultant, and so on.

In I. Molloy et al., "Generative Models for Access Control Policies: Applications to Role Mining Over Logs with Attribution," Proceedings of the 17th ACM symposium on access control models and technologies, pgs. 1-11 (April 2012) (hereinafter "Molloy"), the contents of which are incorporated by reference as if fully set forth herein, LDA was applied to perform role mining from application logs, and to convert topics in LDA to roles in RBAC, where each user represented a document and each word a permission invoked by the user. The present use of LDA is as similar as it is different. Here, two parallel LDA models are mined, one over subjects and their attributes to extract distributions of business roles, and one from descriptions of permissions or resources to extract distributions of technical roles. By correlating these two distributions, models of access over purely semantic information can be learned. These are not directly enforceable enterprise role based access control (ERBAC) models (a discretization process is not performed as in Molloy), but rather only in spirit. These distributions are used herein to perform classifications for previously unseen subjects and permissions, allowing authorization inferences to be made—a feature not present in any prior role mining or role engineering work.

The present techniques offer several advantages over conventional solutions, such as Whyper (Pandita), and hybrid role mining (Frank and Molloy). First, Whyper is limited to instances where near-explicit connections are provided between the subject (Android application) and permission, e.g., "send via SMS and email," and must be taught a domain-specific ontology and vocabulary by reading entity names from source code. The present solution is more abstract, does not require explicit mentions, and learns domain-specific terminology from examples. It also extracts latent attributes when explicit key-value pairs are not available. For example, in the case of Android—only category, developer, and cost attributes are provided, which yield little insights into the necessary permissions.

Figure 2:
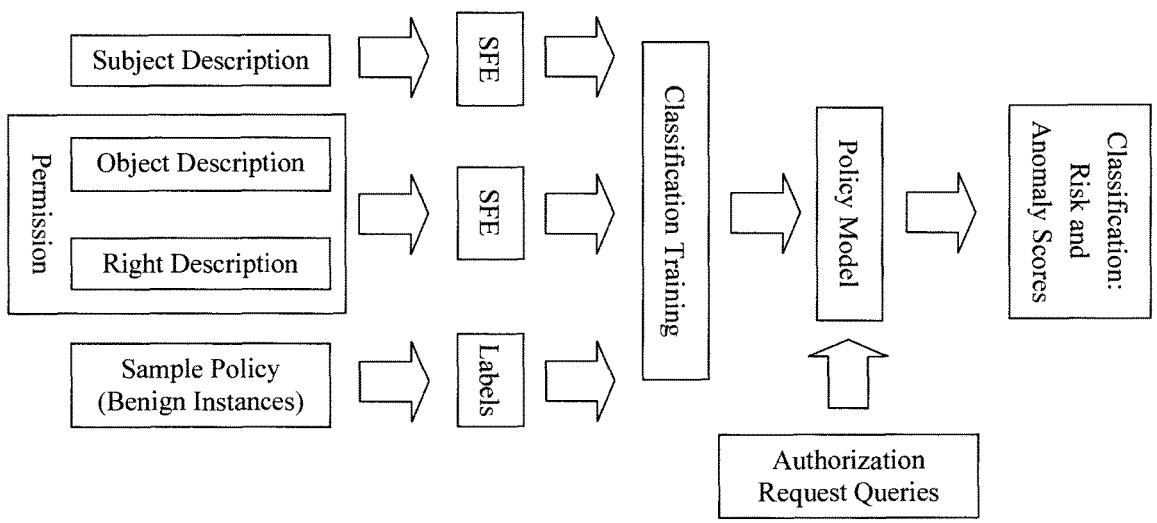
FIG. 2 is a schematic diagram of the present process for inferring a security policy from semantic attributes and use of the security policy to assess authorization request queries according to an exemplary embodiment according to an embodiment of the present invention.

Given the above overview, FIG. 2 provides a schematic representation of the present process for inferring a security policy from semantic attributes according to an exemplary embodiment. With regard to step 102 (of FIG. 1) as shown in FIG. 2, inputs to the present policy model are provided. These inputs include subjects (e.g., users, applications, etc.), permissions (e.g., permission objects, permission rights, etc.), as well as a training set. As provided above, the training set (labeled "Sample Policy") includes example assignments which allow subjects to access the permission objects (labeled "Benign Instances"). It is assumed herein that any subject or permission is described by natural language text descriptions (see, for example, in FIG. 2—"Subject Description," "Object Description," "Right Description," etc.).

Textual descriptions are tokenized into individual words, and any stop-words are removed. Optionally stemming or lemmatization converts any text to its root form. Additionally, domain- or language-specific processing is performed to convert the text into a suitable bag of words. For example, resource names in a file system are tokenized using CamelCase and path delimiters, accents removed, etc. Other key-value pair attributes are kept as pairs and converted to domain-dependent words when collision between keys makes the interpretation of values ambiguous. For example, unique identifiers, often integers, are frequent identifiers into many applications. A subject (such as a user) may belong to department 5, work in division 5, have security clearance 5, and so on.

The following are some non-limiting examples of natural language freeform text descriptions:
Description of an app that requested READ_CONTACTS and SEND_SMS:

No more no-show clients! Book your clients and have text messages (SMS) automatically sent to them before their appointment. Text messages are automatically generated from your configuration and can be set to send 1 hour, 24 hours, and/or 48 hours before the appointment time. This appointment reminder app is perfect for small business owners or anyone who has clients. Prevent your no-show clients and the money you lose to them. Helpful features:—Emails can also be sent to clients—Clients can be imported from your contacts—Our servers will send the SMS message if for some reason your phone is off or loses signal (United States only)—Scheduled appointments can be sorted by client name, date, or appointment. Please keep in mind that this is a beta! Feel free to request features in your comments, and please report any problems and we will fix them ASAP.

Description where the app requests the READ_CONTACTS and SEND_SMS permissions:

Read with ease and comfort your favorite downloaded eBooks from Archambault.ca. Download our free App to read your favorite eBooks on your reading device. Archambault is proud to offer you an integrated reading experience to complete our wide offer of cultural products. This App supports the current protection technologies such as the Adobe DRM, giving you access to eBooks from almost any online library. Our App will allow you to read, save, add bookmarks and notes among other features, on your purchased eBooks. Most current digital files (ePub, PDF, etc) are compatible with this App. Efficient and easy to use, 'My Books' App will satisfy you and the whole family.

With regard to step 104 (of FIG. 1) as shown in FIG. 2, latent topics are next extracted from the processed documents describing the subjects and permissions. See, for example, semantic feature extraction (labeled "SFE") of the subject, object and right descriptions in FIG. 2. As will be described below, known labels can be provided from the training set for use in the LDA process (see "Labels" in FIG. 2). According to one exemplary embodiment, the topic extraction is performed using LDA.

Figure 3:
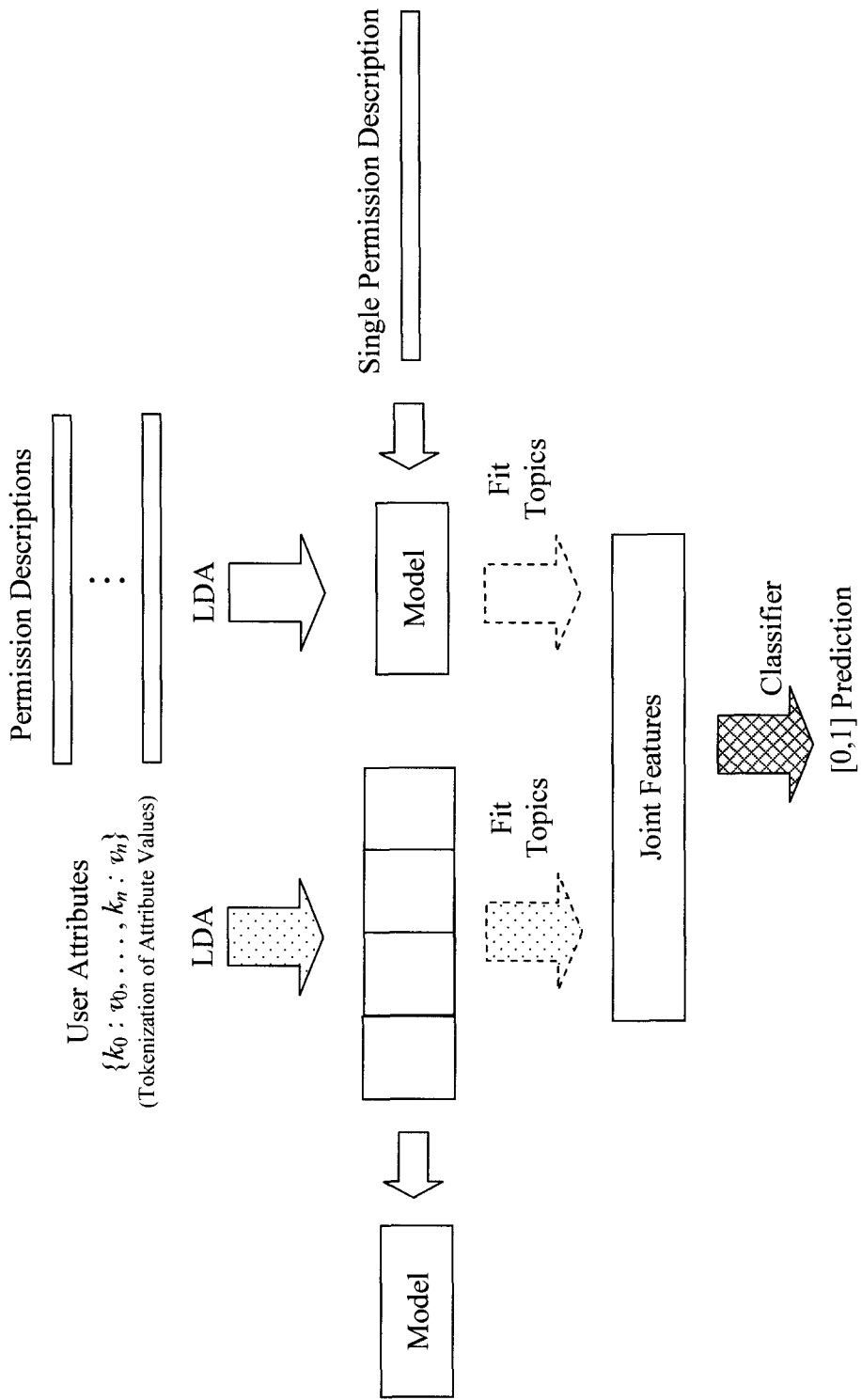
FIG. 3 is a schematic diagram of latent Dirichlet allocation (LDA) being used, in accordance with one example of the present techniques, to build topic models from semantic attributes according to an embodiment of the present invention.

Namely, as now described by way of reference to FIG. 3, topic models may be built over the descriptions of the permissions, e.g., using LDA. For instance, each user is defined as a document, and the description for each permission assigned to the user is added as a sentence to the user-document. As described above, textual descriptions are tokenized into individual words. See FIG. 3 ("Tokenization of Attribute Values"). Next, as shown in FIG. 3, LDA is applied to produce a topic model (labeled "Model"), and to fit each individual permission description (labeled "Single Permission Description") to the model to produce a distribution of topics for the permission. By calculating the topics across the user-documents, and not just over the permission descriptions, information can be leveraged regarding which types of permissions are frequently assigned to the same user. The subjects are fit to n topics and permissions to m topics.

With regard to step 106 (of FIG. 1) as shown in FIG. 2, using the assignment and non-assignment of permissions to subjects in the training set as two distinct classes, classifiers are built (see "Classification Training" in FIG. 2) using the subject-topics and permission-topics as features. As shown in FIG. 2, this process produces a policy model (i.e., security policy query component) for how the latent attributes imply assignment of permissions.

With regard to step 108 (of FIG. 1) as shown in FIG. 2, the policy model (i.e., security policy query component) can then be employed in making security policy decisions. For instance, classifications and predictions can be made from authorization request queries using the policy model (i.e., security policy query component). See FIG. 2.

To perform the classification and prediction, the goal is to learn the degree of match between the user attributes features, and the permission topic distribution. For example, for any subject-permission pair, a distribution of the subject to each of the n subject-topics, and a distribution of the permission to each of the m subject-topics are obtained. These vectors are concatenated together to produce an N+M length vector for classification. The classifier is trained on a randomly selected subset of the N*M feature vectors, where N is the number of subjects and M is the number of permissions.

While LDA is used in the example above, the present techniques are not tied in any way to the use of LDA, and other topic models could work equally as well, if not better, in some situations. A few variations, their advantages, and how to leverage them in the present model are now described.

Labeled LDA learns topics of documents (i.e., the present subjects and permissions), and can be provided with known labels. This approach to topic modeling could be integrated in several unique ways. First, when learning subject topics, the subject could be applied as a label for each assigned permission. Conversely, for permission topics the permission could be applied as a label for each subject. Alternatively, intermediate meta-topics, such as roles obtained from role mining (see, e.g., Frank and Molloy) the subject-permission relation, could be learned and applied. This would directly connect the subject- and permission-topics.

Hidden Topic Markov Models assigns a topic to each sentence instead of each word as LDA does, allowing some words to be assigned different topics when used in a different context. Additionally, the topic of a sentence depends on the topic of the previous sentence using a Markov model. However, due to the brevity of the textural descriptions employed herein—often a single sentence—oftentimes this model degenerates to LDA.

Correlated LDA associates parts of text (such as the description of a subject) with features from another space, such as the permissions assigned to the subject. This is a useful model when one only has semantic features for one entity, such as just subjects or just permissions.

This section describes three data sets from disparate domains which, as described above, can be used in accordance with the present techniques: Android application permissions, filesystem access logs, and enterprise access control policies.

1. Android Permissions—Android applications from the Google Play store. Developers describe features and functionality of their applications and specify which permissions an application requires. The Android application programming interface (API) provides short descriptions of each Android permission. The present techniques may be used to infer the assignment policy, i.e., which permissions are appropriate for an application given its developer-provided description.
2. Filesystem Access Logs—log of files accessed by users in a source code management repository. Here user attributes, including user-supplied textual descriptions, are correlated with semantic features extracted from the full path of the files users access. The desired goal is to scope users to resources that best match their expertise.
3. Corporate Security Policy—from a corporate institution, wherein users are described by their lightweight directory access protocol (LDAP) attributes, and are assigned permissions granting access to custom applications. Each permission is described using short business language descriptions, i.e., jargon, that describes the permission within the application.

In each domain it is necessary to identify the subject and the permission that we will be operating on. As described above, the subjects in the present context are either apps or users, the objects are permission requests, policy assignments, or files accessed. The following are some of the general techniques used herein across all domains to transform the data and extract semantic features from attribute key value pairs and text descriptions.

The main source of information utilized in all domains is text descriptions for both subjects and permissions. These natural language features are complex and diverse, but at the same time capture many of the underlying intents and expectations that are imposed on the systems being evaluated. To eliminate noise and reduce the feature space for this text data, basic Extraction, Preprocessing and Topic Generation are performed.

Extraction—For some data, we first need to extract just the plain text portions for handling. For Android descriptions, the HyperText Markup Language (HTML) may be parsed to extract just the text descriptions, while for other sources plain text may be extracted from filenames, specific documents, permission descriptions, and other potential sources of the data.

Preprocessing—For some cases, in order to normalize the data as much as possible a common list of words is used to drop noise words, known as stop words, and the Porter stemming algorithm is used to map various word forms back down to a single form. See, for example, M. F. Porter, "An algorithm for suffix stripping," Program, 14, no. 3, pp. 130-137 (July 1980).

Latent Dirichlet Allocation (LDA)—LDA is used to extract topics from the text of each subject/permission. LDA finds latent topics that are references within documents which can be thought of as category information. The advantage of LDA is that it naturally deals with co-occurrence of words to find the underlying topics or categories, learning topics automatically with no outside involvement, and it easily scales to very large collections of documents. Further, it works well to both disambiguate words that may share a spelling but have different meanings, such as task which may refer to 'a running application' or 'an event on your calendar', but it also helps to associate words with different spellings that may share a similar semantic meaning, such as 'send', 'reply' and 'respond'.

According to an exemplary embodiment, categorical features are converted to domain-specific terms, e.g., "departmentfive", and these terms are added as the bag-of-words input for LDA. Alternatively, we could independently convert the key-value pairs to high-dimensional binary features and concatenate these feature vectors with the topic distribution extracted by LDA.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
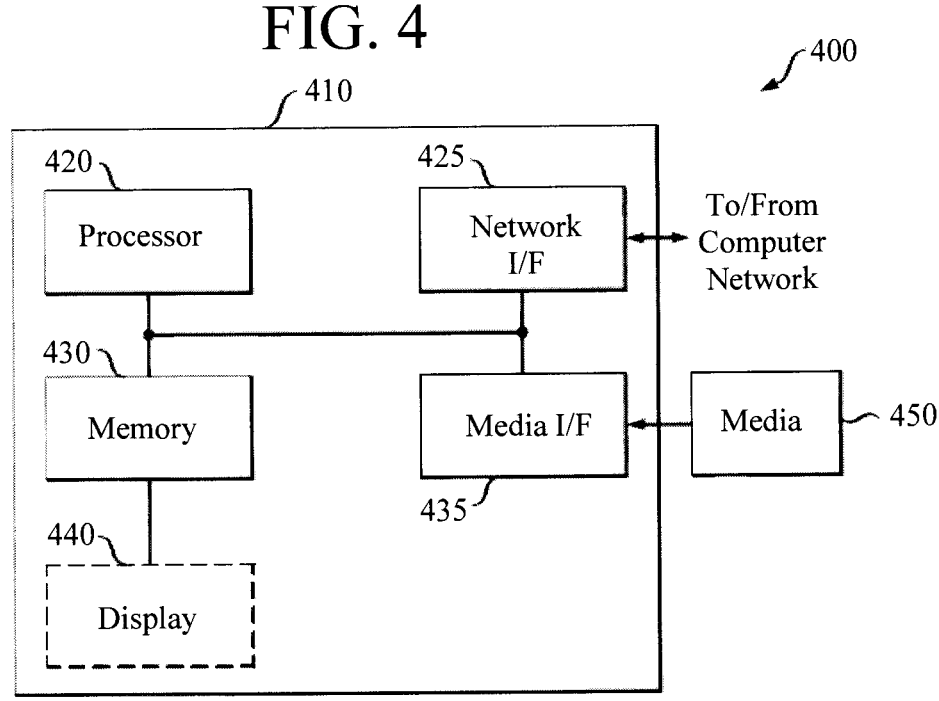
FIG. 4 is a diagram illustrating an exemplary apparatus for performing one or more of the methodologies presented herein according to an embodiment of the present invention.

Turning now to FIG. 4, a block diagram is shown of an apparatus 400 for implementing one or more of the methodologies presented herein. By way of example only, apparatus 400 can be configured to implement one or more of the steps of methodology 100 of FIG. 1.

Apparatus 400 includes a computer system 410 and removable media 450. Computer system 410 includes a processor device 420, a network interface 425, a memory 430, a media interface 435 and an optional display 440. Network interface 425 allows computer system 410 to connect to a network, while media interface 435 allows computer system 410 to interact with media, such as a hard drive or removable media 450.

Processor device 420 can be configured to implement the methods, steps, and functions disclosed herein. The memory 430 could be distributed or local and the processor device 420 could be distributed or singular. The memory 430 could be implemented as an electrical, magnetic or optical memory, or any combination of these or other types of storage devices. Moreover, the term "memory" should be construed broadly enough to encompass any information able to be read from, or written to, an address in the addressable space accessed by processor device 420. With this definition, information on a network, accessible through network interface 425, is still within memory 430 because the processor device 420 can retrieve the information from the network. It should be noted that each distributed processor that makes up processor device 420 generally contains its own addressable memory space. It should also be noted that some or all of computer system 410 can be incorporated into an application-specific or general-use integrated circuit.

Optional display 440 is any type of display suitable for interacting with a human user of apparatus 400. Generally, display 440 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for building a security policy query component executable by a processor, the method comprising the steps of:
   (a) providing subjects and permissions related to making a security policy decision, as well as a training set of permission-to-subject assignments, as inputs to the security policy query component;
   (b) extracting semantic attributes from natural language freeform text descriptions of the subjects and the permissions, wherein the step (b) of extracting the semantic attributes comprises the step of: building subject-topic models and permission-topic models independently for the subjects and the permissions directly from the natural language freeform text descriptions of the subjects and the permissions; and
   (c) using machine learning to build the security policy query component based on the permission-to-subject assignments in the training set and the semantic attributes extracted in step (b), wherein the step (c) of using machine learning to build the security policy query component comprises the step of: using assignment of permissions-to-subjects and non-assignment of permissions-to-subjects in the training set as classes to build classifiers with the subject-topic models and the permission-topic models as features.

2. The method of claim 1, wherein the security policy decision relates to one or more of granting or denying permissions to the subjects which allows them to perform specific operations on objects.

3. The method of claim 1, further comprising the step of: tokenizing the natural language freeform text descriptions of the subjects and the permissions into individual words.

4. The method of claim 1, wherein the subjects comprise users or applications.

5. The method of claim 4, wherein the applications comprise Android™ applications.

6. The method of claim 1, wherein the permissions comprise permission objects and permission rights.

7. The method of claim 6, wherein the permission objects comprise one or more of application permissions, filesystem resources, and enterprise application resources.

8. The method of claim 1, further comprising the step of: using the security policy query component in making the security policy decision.

9. The method of claim 8, further comprising the step of: using the security policy query component to assess risks for existing authorizations.

10. The method of claim 8, further comprising the step of: using the security policy query component to provide recommendations for assignments of both new subjects and new permissions.

11. The method of claim 1, wherein the semantic attributes are extracted using latent Dirichlet allocation (LDA).

12. The method of claim 1, wherein the subject-topic models and the permission-topic models are built using LDA.

13. A computer program product for building a security policy query component, the computer program product comprising a non-transitory computer readable storage medium having program instructions embodied therewith, the program instructions executable by a computer to cause the computer to:

(a) provide subjects and permissions related to making a security policy decision, as well as a training set of permission-to-subject assignments, as inputs to the security policy query component;

(b) extract semantic attributes from natural language freeform text descriptions of the subjects and the permissions, wherein the program instructions when extracting the semantic attributes further cause the computer to: build subject-topic models and permission-topic models independently for the subjects and the permissions directly from the natural language freeform text descriptions of the subjects and the permissions; and (c) use machine learning to build the security policy query component based on the permission-to-subject assignments in the training set and the semantic attributes extracted in (b), wherein the program instructions when using machine learning to build the security policy query component further cause the computer to: use assignment of permissions-to-subjects and non-assignment of permissions-to-subjects in the training set as classes to build classifiers with the subject-topic models and the permission-topic models as features.

14. The computer program product of claim 13, wherein the program instructions further cause the computer to:
tokenize the natural language freeform text descriptions of the subjects and the permissions into individual words.

15. The computer program product of claim 13, wherein the subjects comprise users or applications.

16. The computer program product of claim 13, wherein the permissions comprise permission objects and permission rights.

17. An apparatus for creating a building a security policy query component, the apparatus comprising:

a memory; and at least one processor device, coupled to the memory, operative to:

(a) provide subjects and permissions related to making a security policy decision, as well as a training set of permission-to-subject assignments, as inputs to the security policy query component;

(b) extract semantic attributes from natural language freeform text descriptions of the subjects and the permissions, wherein extracting the semantic attributes comprises: building subject-topic models and permission-topic models independently for the subjects and the permissions directly from the natural language freeform text descriptions of the subjects and the permissions; and (c) use machine learning to build the security policy query component based on the permission-to-subject assignments in the training set and the semantic attributes extracted in (b), wherein using machine learning to build the security policy query component comprises: using assignment of permissions-to-subjects and non-assignment of permissions-to-subjects in the training set as classes to build classifiers with the subject-topic models and the permission-topic models as features.

* * * * *